LEANDER R. STREETER, OF CHELSEA, MASSACHUSETTS.

Letters Patent No. 85,038, dated December 15, 1868.

IMPROVED PLATE FOR ARTIFICIAL TEETH.

The Schedule referred to in these Letters Patent and making part of the same.

Be it known that I, LEANDER R. STREETER, of Chelsea, in the State of Massachusetts, have invented or discovered a new and useful Improvement in or Compound for Bases or Plates for Artificial Teeth and Gums, of which the following is a full description.

My invention or discovery consists mainly in the use of disintegrated tortoise-shell, turtle-shell, horn, and similar substances.

In the preparation and use of this or these materials, I disintegrate the shell, &c., in any desirable mode, as by grinding, by shredding, by teethed, sharp-edged, or other suitable apparatus; and, when disintegrated, I subject it to the action of boiling water, say for half an hour, more or less, before placing it in the mould; or I place it in the mould in a dry state, and then press it well down in the usual manner. It is then, when placed in the mould and pressed down, subjected to the action of heat, (dry steam or water,) and, when sufficiently softened, the pressure is increased until the whole is compressed into a firm and solid body.

After being allowed to dry in the mould, and then cooled, it may be further treated with oil, wax, or other suitable substance to fill the pores of the cast. It is then in condition for finishing.

By subjecting the plate to a moderate heat, say 200° or thereabouts, it may be bent, and altered in shape.

What I claim, is—

The use of tortoise-shell, turtle-shell, horn, and similar bodies, or those of similar composition, in making dental plates or bases for artificial teeth, substantially as described.

In testimony whereof, I have hereunto subscribed my name.

L. R. STREETER.

Witnesses:
   W. M. PARKER,
   EDWIN FRENCH.